(12) United States Patent
Dieckilman

(10) Patent No.: US 9,623,491 B2
(45) Date of Patent: Apr. 18, 2017

(54) BEVELING / CHAMFERING TOOL—ROUTER HEAD FOR METAL

(71) Applicant: Thomas M. Dieckilman, Carlsbad, CA (US)

(72) Inventor: Thomas M. Dieckilman, Carlsbad, CA (US)

(73) Assignee: Thomas M. Dieckilman, Carlsbad, CA (US)

( * ) Notice: Subject to any disclaimer, the term of this patent is extended or adjusted under 35 U.S.C. 154(b) by 0 days.

(21) Appl. No.: 14/302,021

(22) Filed: Jun. 11, 2014

(65) Prior Publication Data

US 2014/0363251 A1  Dec. 11, 2014

Related U.S. Application Data

(60) Provisional application No. 61/956,558, filed on Jun. 11, 2013.

(51) Int. Cl.
*B23C 5/10* (2006.01)
*B23C 3/12* (2006.01)

(52) U.S. Cl.
CPC ............ *B23C 3/126* (2013.01); *B23C 5/10* (2013.01); *B23C 2210/04* (2013.01);
(Continued)

(58) Field of Classification Search
CPC  B23C 5/12; B23C 5/10; B23C 5/1054; B23C 2240/24; B23C 2240/32;
(Continued)

(56) References Cited

U.S. PATENT DOCUMENTS

| 2,207,542 | A | * | 7/1940 | Hedin | B23B 51/107 236/1 D |
| 2,374,552 | A | * | 4/1945 | Marini | B23B 51/107 408/201 |

(Continued)

FOREIGN PATENT DOCUMENTS

| BG | 19649 | 10/1975 |
| CH | 701414 | 1/2011 |

(Continued)

OTHER PUBLICATIONS

Machine Translation of German reference DE 29721963, Nov. 30, 2015, pp. 3-5.*

(Continued)

*Primary Examiner* — Sunil K Singh
*Assistant Examiner* — Nicole N Ramos
(74) *Attorney, Agent, or Firm* — Westman, Champlin & Koehler, P.A.; Steven M. Koehler

(57) ABSTRACT

The present invention provides a beveling tool including: a body with a shaft hole formed through the center; a plurality of cutter blades arranged at predetermined distances on the circumferential surface of the body, each having a radial primary blade with a radial primary relief angle ranging from about 10 to about 20 degrees and a radial secondary blade with a radial secondary relief angle ranging from about 25 to about 35 degrees (or about 35 to about 45 degrees); discharge grooves formed longitudinally between the cutter blades to discharge chips produced in beveling; and a shank inserted in the shaft hole of the body, in which the body and the shank are connected by brazing. With the beveling tool of the present invention, it is possible to smoothly discharge chips produced in beveling and to prevent damage to the cutter blades.

9 Claims, 3 Drawing Sheets

(52) U.S. Cl.
CPC .... *B23C 2210/123* (2013.01); *B23C 2220/16* (2013.01); *B23C 2220/40* (2013.01); *B23C 2260/08* (2013.01); *B23C 2265/08* (2013.01); *Y10T 408/906* (2015.01); *Y10T 408/909* (2015.01); *Y10T 409/30644* (2015.01)

(58) Field of Classification Search
CPC ............ B23C 2220/16; B23C 2220/20; B23C 2210/123; B23C 2210/60; B23C 2210/321; B23C 2210/44; B23C 2210/248; B23C 3/12; B23C 3/122; B23C 3/126; Y10T 407/1946; Y10T 409/30952; Y10T 408/909; Y10T 408/906
USPC .......... 409/234, 201, 178, 179, 180; 407/53; 279/83, 143, 145; 408/227, 224
See application file for complete search history.

(56) References Cited

U.S. PATENT DOCUMENTS

| | | | | |
|---|---|---|---|---|
| 2,613,558 A | * | 10/1952 | Swenson | ................. B23B 51/10 |
| | | | | 408/143 |
| 4,572,714 A | | 2/1986 | Suzuki | |
| 4,865,093 A | * | 9/1989 | Ford | .......................... B23C 3/12 |
| | | | | 144/135.4 |
| 5,122,040 A | * | 6/1992 | Fields | ....................... B23C 5/10 |
| | | | | 29/888.022 |
| 5,647,700 A | * | 7/1997 | Velepec | .................. B23C 3/126 |
| | | | | 144/134.1 |
| 5,810,517 A | * | 9/1998 | Bostic | ....................... B23C 5/10 |
| | | | | 407/53 |
| 5,833,402 A | * | 11/1998 | Martin | .................. B23C 5/1009 |
| | | | | 279/86 |
| 6,048,142 A | | 4/2000 | Hashimoto | |
| 6,056,485 A | * | 5/2000 | Magill | ....................... B23C 5/10 |
| | | | | 407/54 |
| 7,103,950 B1 | | 9/2006 | Scheffer | |
| 2005/0025584 A1 | | 2/2005 | Kolker et al. | |
| 2011/0097163 A1 | * | 4/2011 | Swiatowy | ............... B23C 3/007 |
| | | | | 407/40 |

FOREIGN PATENT DOCUMENTS

| | | | | |
|---|---|---|---|---|
| DE | 4323201 A1 | * | 1/1995 | ............ B23B 51/02 |
| DE | 29721963 U1 | * | 1/1998 | |
| DE | 202006006114 | | 6/2006 | |
| DE | 102008034784 | | 12/2009 | |
| EP | 0155216 A1 | * | 9/1985 | ............ B23B 51/02 |
| JP | 57127608 U | * | 8/1982 | |
| JP | S61252015 | | 11/1986 | |
| JP | 2224910 A | * | 9/1990 | |
| JP | H06226522 | | 8/1994 | |
| JP | H0871831 | | 3/1996 | |
| JP | 2003334715 A | * | 11/2003 | |
| JP | 2006021278 A | * | 1/2006 | |
| JP | 2013111709 A | * | 6/2013 | |
| KR | WO2010021487 | * | 2/2010 | |

OTHER PUBLICATIONS

Machine Translation of KR reference WO2010/021487 equivalent to PCT/KR2009/004610, Nov. 30, 2015, pp. 1-3.*
International Prelimiary Report on Patentability for International Application No. PCT/NL2013/000038, mailed Jan. 5, 2015.
Response to Written Opinion dated Oct. 27, 2014, filed Nov. 27, 2014 for International Application No. PCT/NL2013/000038.
International Search Report from PCT/NL2013/00038 mailed Nov. 14, 2013.
Chinese Office Action for related Chinese patent application No. 201380035194.2, dated Jan. 29, 2016.
Patent Examination Report No. 1 for Australian patent application No. 2013285687, dated Sep. 2, 2016.

\* cited by examiner

BEVELING / CHAMFERING TOOL—ROUTER HEAD FOR METAL

CROSS-REFERENCE TO RELATED APPLICATION

This application claims the benefit of U.S. Provisional Patent Application 61/956,558 filed Jun. 11, 2013, the content of which is incorporated herein by reference in its entirety.

TECHNICAL FIELD

The present invention relates to a beveling tool, more commonly described as a router head for metal, which fits on standard power tools and forms the edge of a work piece more uniformly than previous tools by means of on a unique multiple blade and discharge channel cutting head design.

BACKGROUND ART

The discussion below is merely provided for general background information and is not intended to be used as an aid in determining the scope of the claimed subject matter.

The beveling machines of the related art include a drive unit and a power transmission unit in a main body having a handle and a spindle mounted on a head unit and rotated by power from the power transmission unit.

A cutter head is mounted on the free end of the spindle and a flange plate is installed between the cutter and the spindle by means of a case, a guide shaft, and a ball bearing.

In beveling tools with such a configuration, the edge of a work piece is aligned with the cutter, the driving unit in the body is driven by a power transmission unit, and the driving force rotates the spindle through the power transmission unit. With the rotation of the spindle, the cutter at the free end is rotated and machines the edge of the work piece while rotating.

When the edge of a work piece is machined with previous tools; however, beveling machines have a problem in that the work piece and the cutter come in contact with each other, the spindle chatters, which can result in an imperfect edge finish and the internal parts can be damaged by a shock due to the chattering and result in rapidly wearing tools.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is a beveling cutter that may include a body with a shaft hole formed through a center of the body along a rotational axis. A plurality of cutter blades are arranged at predetermined distances on the circumferential surface of body, each cutter blade having a radial primary blade with a radial primary relief angle ranging from about 10 to about 20 degrees and a radial secondary blade with a radial secondary relief angle ranging from about 25 to about 35 degrees. Discharge grooves are provided longitudinally between the cutter blades to discharge chips produced in beveling. A shank can be inserted in the shaft hole of the body, wherein the body and the shank are mechanically attached by means of a center connecting screw, brazing or adhesive.

In one embodiment, a protruded post at the top of the cutter is configured to cooperate with a fastener so as to support a bearing on the protruded post.

In one embodiment, the bearing on the top may be mounted on the protruded post by fitting the bearing onto the post and then tightening a fixing screw into the threaded hole. With a bevelling tool such as that described, since the radial primary relief angle and the radial secondary relief angle range from about 10 to about 20 degrees and from about 25 to about 35 degrees (or about 35 to about 45 degrees), respectively, there are advantages in that it is possible to reduce load generated while beveling a work piece and prevent or inhibit machining interference and chattering by ensuring a sufficient gap between the work piece and the radial primary blades.

Additionally, with a beveling tool such as described, since a horned portion is formed at a side of the radial primary blade, there is the advantage in that it is possible to prevent or inhibit the cutter blades from breaking and chattering.

With a beveling tool such as described, since the cutter blades have an edge angle ranging from about 15 to about 60 degrees without a helix angle, there are also advantages in that it is possible to perform more precise machining on a work piece and improve surface finish of the work piece.

DETAILED DESCRIPTION OF THE ILLUSTRATIVE EMBODIMENT

Figure 1:
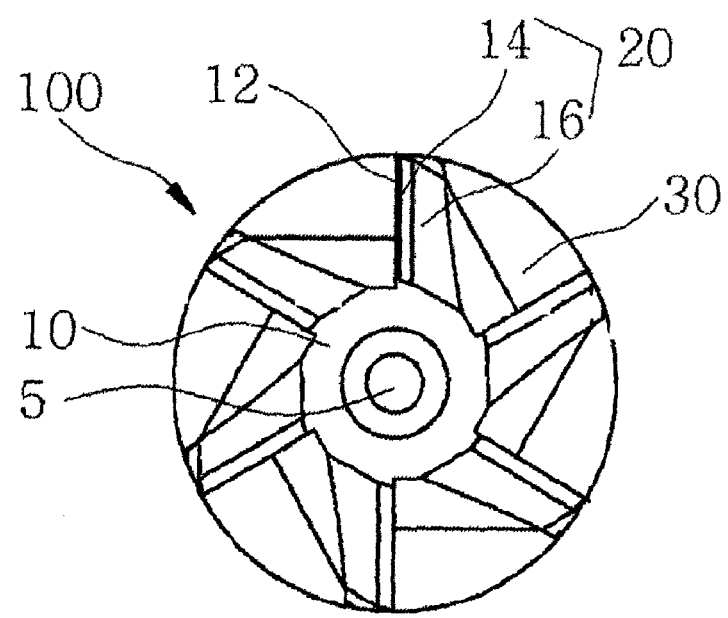
FIG. 1 is a plan view showing a beveling cutter.
Figure 2:
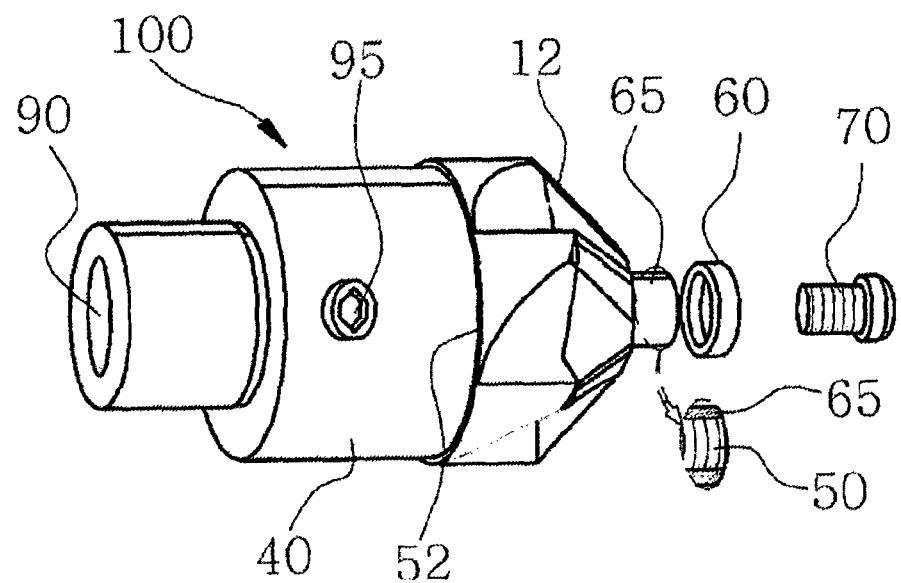
FIG. 2 is a perspective view showing the combination status of a beveling cutter and a shank.

Beveling tool 100 in the form of an embodiment of the present invention, as shown in FIGS. 1 and 2 includes a body 10, a plurality of cutter blades 20 arranged at predetermined distances on the circumferential surface of the body 10, discharge grooves 30 formed longitudinally and radially between the cutter blades 20 to discharge chips produced in beveling. A shaft hole 5 is formed through a center of the body 10 along a rotational axis and the center of the six cutter blades 20 arranged at predetermined distances. A shank 40 is inserted in the shaft hole 5 of the body 10 with the shank 40 fixedly secured to the body 10 such as through by way of example a center connecting screw, brazing or use of an adhesive.

In the embodiment illustrated, each of the cutter blades 20 has a radial primary blade 14 with a radial primary relief angle in a range from about 10 to about 20 degrees and a radial secondary blade 16 with a radial secondary relief angle in a range from about 25 to about 35 degrees. The width of the radial primary blade 14 is in a range from about 0.7 to about 0.8 mm and the width of the radial secondary blade 16 is in a range from about 2.2 to about 2.3 mm.

In one embodiment, the radial primary relief angle is selected to be at an angle in the range of about 10 to about 20 degrees, so as to reduce a load applied in the beveling of a work piece (not shown). At this angle the radial primary relief angle provides optimal conditions for breaking and cutting a work piece.

Honed portions 12 are formed by honing a side of the radial primary blades 14 at an angle ranging from about 1 to about 45 degrees to prevent the cutter blades 20 from breaking or chattering. Although the honed portions 12 may be about 0.05 to about 0.2 mm wide, in one embodiment it is preferable to make them about 0.1 mm wide.

The radial secondary relief angle is selected to an angle in the range of about 25 to about 35 degrees, which prevents or inhibits machining interference and chattering by ensuring a sufficient gap between a work piece and the radial primary blade 14 in beveling.

The cutter blades 20 can be straight or can be formed with a helix angle. An edge angle can be in the range of about 15 to about 60 degrees. The edge angle may be understood as the meaning of a beveling angle of the cutter.

The shank 40 is formed in a cylindrical shape with portions having differing diameters. A first portion has a diameter so as to be inserted in the shaft hole 5. The shank 40 is fixedly secured to the body 10 such as through brazing along perimeter edges of the shank 40 and the body to form a brazed joint 52.

As shown in FIG. 2, a protrusion 65 of the shank 40 supports a bearing 60. The protrusion 65 can include a hole 50 configured to a receive a fastener 70 such as a threaded bolt. The fastener 70 has a shape to couple and retain a bearing 60 on the protrusion 65 of the shank 40. In the illustrated embodiment, the bearing 60 is mounted on the protrusion 65 by fitting the bearing 60 onto the protrusion 65 and then tightening a fixing bolt 70 into the threaded hole 50.

An end of the shank opposite the protrusion 65 is configured for coupling to a rotational drive or spindle such as provided on an electric tool (not shown). A portion 95 of the shank, for example, at a center of the shank 40 can be configured to mate with a wrench (not shown) for easy attachment/detachment of the beveling tool 100 to a rotational drive or spindle.

Figure 3:
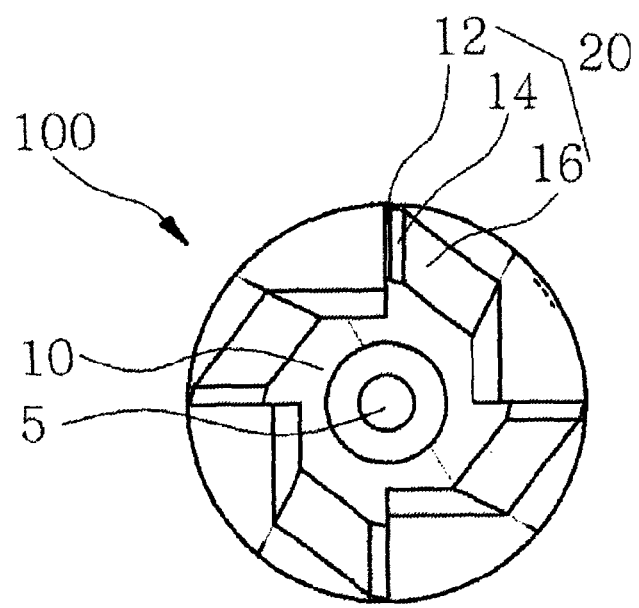
FIG. 3 is a plan view showing a beveling cutter.
Figure 4:
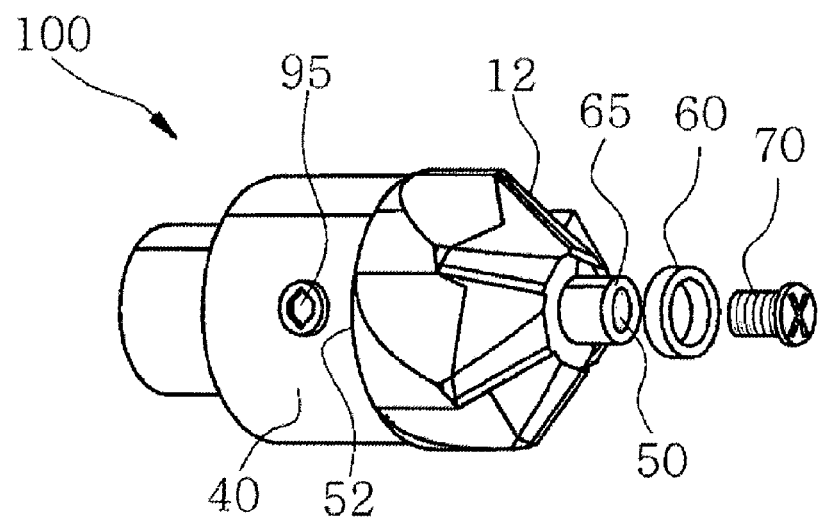
FIG. 4 is a perspective view showing the combination status of a beveling cutter and a shank.

Another embodiment of a beveling tool is illustrated in FIGS. 3 and 4. In this embodiment, four cutter blades 20 are provided, as shown in FIGS. 3 and 4. Further, the radial secondary relief angle is selected within the range of about 35 to about 45 degrees. In one embodiment, the radial secondary relief angle changes because four cutter blades 20 are provided. The other factors, including the radial primary relief angle, are similar to those in the embodiment described above, so a detailed description is not provided.

The description below shows how to mount the beveling tools the configurations described above on a drive such as an air tool or an electric tool and to bevel a work piece.

Figure 5:
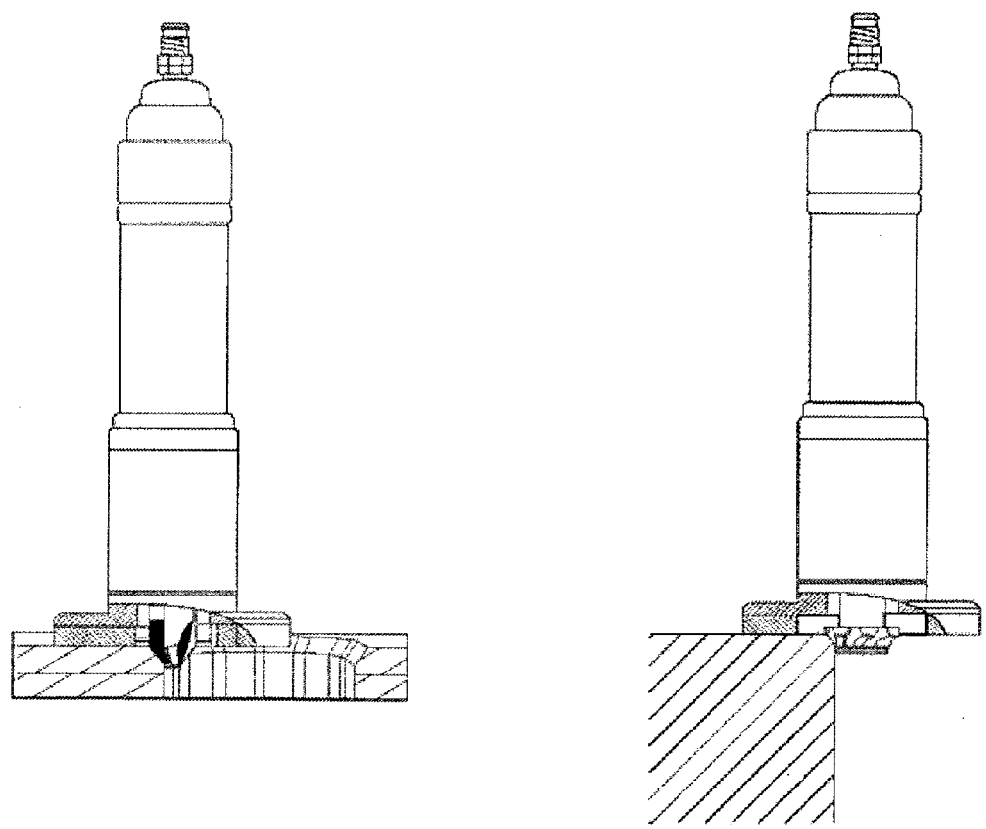
FIG. 5 is an elevational view of the beveling cutter mounted on a power tool and forming the interior and exterior edge of a work piece.

The beveling tool is fastened to a drive such as an air tool or an electric tool (FIG. 5) by inserting and fitting a rotary shaft of the air tool or the electric tool into the threaded hole 90 at the end of the shank 40. With the beveling tool 100 fastened to the drive such as an air tool or an electric tool, when the beveling tool 100 is brought in contact with a work piece (not shown) and the power switch is turned on a rotational drive unit (motor or the like) operates and rotates the cutter blades 20 of the beveling tool 100.

As the cutter blades 20 rotate, beveling on the work piece starts. Chips (not shown) that are produced by the beveling surfaces of the cutter blades 20 are discharged through the discharge grooves 30 during beveling of the work piece. Further, the cutter blades 20 are commonly coated, so that the chips are easily discharged without damaging the surfaces of the cutter blades 20.

Since the cutter blades 20 have the honed portion 12 on a side of the radial primary blade 14, the cutter blades 20 can be prevented from breaking and the surface finish of the work piece can be improved in beveling the work piece. Further, small particles are sintered in the honed portion 12, so that beveling can be implemented by the cutter blades with very sharp lines even in high-speed rotation while the lifespan of the cutter blades 20 can be considerably increased and high-quality surfaces can be achieved.

Since the radial primary blade 14 has a radial primary relief angle ranging from about 10 to about 20 degrees, the load required in beveling can be reduced. Further, since the radial primary blades 14 have the radial primary relief angle, it is possible to not only reduce damage to the cutter blades, but provide optimal conditions for cutting. Further, since the radial secondary relief angle of the radial secondary blade 16 connected with the radial primary blade 14 in a range from about 25 to about 35 degrees, a sufficient gap is ensured between the work piece and the radial primary blade 14 in beveling and thus machining interference and chattering can be prevented or inhibited. In addition, the cutter blades 20 can smoothly move in a desired cutting direction due to the radial secondary relief angle. The embodiment of the present invention illustrated in FIGS. 3 and 4 was configured to coincide with the performance desired by users by changing the number of the cutter blades to four. Further, the operation of the beveling tool according to the embodiment of FIGS. 3 and 4 is almost similar to that of the embodiment described above and thus not mentioned here.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A beveling tool comprises a body with a shaft hole formed through a center thereof, a plurality of cutter blades arranged at predetermined distances on a circumferential surface of the body, each having a radial primary blade with a radial primary relief angle in a range from about 10 to about 20 degrees and a radial secondary blade with a radial secondary relief angle in a range from about 25 to about 45 degrees, and discharge grooves formed longitudinally between the cutter blades configured to discharge chips produced in beveling.

2. The beveling tool of claim 1, wherein a width of each radial primary blade is in a range from about 0.7 to about 0.8 mm and a width of the radial secondary blade is in a ranges from about 2.2 to about 2.3 mm.

3. The beveling tool of claim 1, wherein the cutter blades have an edge angle in a range from about 15 to about 60 degrees.

4. The beveling tool according to claim 1, and further comprising a shank secured to the body, the shank having a protrusion configured to support a bearing and an end opposite the protrusion configured for coupling to a rotational drive.

5. The beveling tool according to claim 4, wherein the bearing is mounted on the protrusion by fitting the bearing onto a circumferential surface of the protrusion and wherein the protrusion is configured to receive a fastener to retain the bearing on the protrusion.

6. The beveling tool according to claim 4, wherein a portion of the shank is configured to cooperate with a wrench for attachment/detachment of the beveling tool.

7. The beveling tool according to claim 1, wherein honed portions are provided on a side of the radial primary blades of the cutter blades at an angle in the range from about 1 to about 45 degrees.

8. The beveling tool according to claim 7, wherein a width of each of the honed portions is in a range from about 0.05 to about 0.2 mm.

9. The beveling tool according to claim 1 and further comprising a shank having an end portion configured for insertion in the shaft hole of the body, wherein the body and the shank are mechanically secured together.

\* \* \* \* \*